(12) United States Patent
MacFarlane

(10) Patent No.: US 12,429,319 B1
(45) Date of Patent: Sep. 30, 2025

(54) QUICK ACCESS FIREARM MAGAZINE HOLDER FOR TACTICAL VESTS

(71) Applicant: James MacFarlane, Raeford, NC (US)

(72) Inventor: James MacFarlane, Raeford, NC (US)

(73) Assignee: ALPINE DENIZEN LLC, Raeford, CA (US)

( * ) Notice: Subject to any disclaimer, the term of this patent is extended or adjusted under 35 U.S.C. 154(b) by 137 days.

(21) Appl. No.: 18/077,211

(22) Filed: Dec. 7, 2022

Related U.S. Application Data

(60) Provisional application No. 63/287,221, filed on Dec. 8, 2021.

(51) Int. Cl.
  F42B 39/02 (2006.01)
  A45F 5/02 (2006.01)
  F16B 1/00 (2006.01)

(52) U.S. Cl.
  CPC .............. *F42B 39/02* (2013.01); *A45F 5/02* (2013.01); *F16B 1/00* (2013.01); *F16B 2200/81* (2023.08)

(58) Field of Classification Search
  CPC .... F42B 39/02; A45F 5/02; A45F 2200/0591; F16B 1/00; F16B 2200/81
  USPC ........................................................ 224/931
  See application file for complete search history.

(56) References Cited

U.S. PATENT DOCUMENTS

| | | | |
|---|---|---|---|
| 1,464,659 A * | 8/1923 | Keely | A45F 5/021 224/675 |
| 1,756,677 A | 4/1930 | Cook | |
| 2,477,806 A * | 8/1949 | Isaacson | F41A 9/83 224/663 |
| 2,797,034 A * | 6/1957 | Blackman | F42B 39/02 224/247 |
| 4,588,116 A * | 5/1986 | Litman | A45F 5/02 224/672 |
| 5,013,074 A * | 5/1991 | Galle | A47G 23/0241 215/396 |
| D328,216 S * | 7/1992 | Steed | D6/567 |
| 5,232,137 A * | 8/1993 | Devine | A45F 5/02 224/678 |
| 6,154,997 A | 12/2000 | Aluttto et al. | |
| 6,176,401 B1 | 1/2001 | Lim | |
| 6,220,557 B1 * | 4/2001 | Ziaylek | F17C 13/084 248/316.1 |
| 6,557,738 B1 * | 5/2003 | Meintzer | B44D 3/14 224/678 |
| 7,216,721 B2 * | 5/2007 | Jacobson | A62C 13/78 169/44 |
| 7,562,482 B1 | 7/2009 | Johnson | |
| 7,669,742 B2 * | 3/2010 | Rush | A45F 5/00 248/316.1 |
| 8,485,405 B2 | 7/2013 | Crye | |
| 8,887,977 B2 | 11/2014 | Ralph | |
| 9,097,489 B2 | 8/2015 | Chiang | |

(Continued)

*Primary Examiner* — Peter N Helvey
(74) *Attorney, Agent, or Firm* — John Rizvi; John Rizvi, P.A.—The Patent Professor®

(57) ABSTRACT

A magazine holder includes a backplate. The magazine holder also includes an upper holder coupled to a front surface of the backplate, wherein the upper holder is configured to detachably secure an upper portion of a firearm magazine to the front surface of the backplate. The magazine holder also includes a lower holder coupled to the front surface of the backplate, wherein the lower holder is configured to detachably secure a lower portion of the firearm magazine to the front surface of the backplate.

20 Claims, 15 Drawing Sheets

(56) References Cited

U.S. PATENT DOCUMENTS

| | | |
|---|---|---|
| 9,170,064 B2 | 10/2015 | Rogers |
| 9,404,696 B2 | 8/2016 | Karimullah et al. |
| 9,459,062 B2 | 10/2016 | Shaskan |
| D772,368 S * | 11/2016 | Evans .......................... D22/108 |
| 9,651,347 B2 * | 5/2017 | Rodriguez .............. A45F 5/021 |
| 9,668,568 B2 * | 6/2017 | Evans ...................... A45F 5/00 |
| 9,746,299 B1 | 8/2017 | Davis |
| 9,877,096 B2 * | 1/2018 | Harms ................ F16M 13/022 |
| 9,945,672 B2 | 4/2018 | Balasubramanian et al. |
| 10,039,423 B2 * | 8/2018 | Schultz ................ A47K 5/1211 |
| 10,161,732 B2 | 12/2018 | Purkiss |
| 10,238,201 B2 * | 3/2019 | Swan ........................ A45F 5/00 |
| 10,306,973 B2 * | 6/2019 | Evans ...................... F42B 39/02 |
| D853,109 S | 7/2019 | Wilson |
| 10,520,292 B1 | 12/2019 | Westhafer |
| 10,537,167 B2 * | 1/2020 | Bryant .................... A45F 5/021 |
| 10,767,969 B2 | 9/2020 | Brozda |
| 10,809,029 B1 | 10/2020 | Lerner |
| D901,880 S | 11/2020 | Benn |
| 10,962,318 B2 | 3/2021 | LeMarbe et al. |
| 11,033,095 B1 * | 6/2021 | VanHeusen ............... A45F 5/00 |
| D925,001 S * | 7/2021 | Guy ............................ D23/208 |
| 11,536,550 B1 * | 12/2022 | Smith ..................... F42B 39/02 |
| 2004/0200111 A1 | 10/2004 | Horn |
| 2005/0045681 A1 * | 3/2005 | Hancock ............. B60R 11/0205 224/420 |
| 2008/0023509 A1 | 1/2008 | Lowe |
| 2008/0105722 A1 * | 5/2008 | Howell .............. A41D 13/0012 224/241 |
| 2010/0176934 A1 | 7/2010 | Chou et al. |
| 2011/0107645 A1 * | 5/2011 | Faifer ..................... F42B 39/02 42/90 |
| 2013/0014472 A1 | 1/2013 | Williams |
| 2014/0124387 A1 * | 5/2014 | Iannello .................. F42B 39/26 206/3 |
| 2014/0215886 A1 | 8/2014 | Owens |
| 2014/0262842 A1 * | 9/2014 | Beck ....................... F42B 39/26 29/428 |
| 2016/0003598 A1 * | 1/2016 | Gadams ................. B65D 25/04 224/191 |
| 2020/0309483 A1 | 10/2020 | Neill |

\* cited by examiner

QUICK ACCESS FIREARM MAGAZINE HOLDER FOR TACTICAL VESTS

CROSS-REFERENCE TO RELATED APPLICATIONS

This application claims the benefit of U.S. Provisional Patent Application Ser. No. 63/287,221, filed on Dec. 8, 2021, which is incorporated by reference herein in its entirety.

FIELD OF THE INVENTION

The present disclosure relates generally to firearms and firearm accessories, and more particularly, to a magazine holder for firearms.

BACKGROUND OF THE INVENTION

Firearms and other projectile-based weapons are critical to the functions and operations of law enforcement and military personnel. Modern firearms, for example, handguns, rifles, machine pistols, etc., are designed for high cyclic rates of fire and, as such, need to actively hold multiple rounds of ammunition. To achieve this, modern firearms are designed to utilize ammunition magazines. Ammunition magazines are devices that are mounted to a firearm and store multiple rounds of ammunition, e.g., cartridges. The ammunition magazines store the cartridges in a manner such that as one cartridge is used, a new cartridge is retrieved from the magazine and loaded into the firearm. Once all the cartridges in a magazine are used, the firearm is reloaded by replacing the spent magazine with a new magazine that is loaded with unused cartridges. These magazines are manually released from the firearm, and a new magazine is manually loaded into the firearm.

Because of the rate at which modern firearms expend ammunition, law enforcement and military personnel need to carry and transport an ample supply of extra magazines. Multiple devices have been developed to carry extra ammunition magazines. In its simplest form, law enforcement and military personnel can carry extra ammunition magazines in a backpack or bag. However, the use of backpacks and bags is not ideal. To retrieve the ammunition magazines, the backpack or bag has to be removed and opened. These actions increase the amount of time required by law enforcement and military personnel to reload firearms, i.e. to mount a loaded, new magazine onto the firearms. The increased reload time, however, is not desirable in live-action situations when time is critical.

Another type of device for carrying extra ammunition magazines is a protective pouch. The protective pouch typically consists of a closed bottom structure in which a single ammunition magazine can be placed. The protective pouch includes a flap that, when closed, retains the single ammunition magazine within the pouch. The protective pouch can be attached to garments of law enforcement and military personnel, for example, on a belt. The protective pouches, however, suffer the same drawbacks. The protective pouch must be located and opened to access the single ammunition magazine. This can increase the reload time of the firearm.

There remains a need in the art for a solution to at least one of the aforementioned problems. For example, there is an established need for devices that store ammunition magazines such that the ammunition magazines that are easily accessible and readily available for use by an operator of a firearm.

SUMMARY OF THE INVENTION

In an aspect, a magazine holder includes a backplate. The magazine holder also includes an upper holder coupled to a front surface of the backplate, wherein the upper holder is configured to detachably secure an upper portion of a firearm magazine to the front surface of the backplate. The magazine holder also includes a lower holder coupled to the front surface of the backplate, wherein the lower holder is configured to detachably secure a lower portion of the firearm magazine to the front surface of the backplate.

In another aspect, the backplate of the magazine holder can approximate a shape of the firearm magazine.

In another aspect, the upper holder can include a retaining arm, a side stop, and a top stop. The retaining arm and the side stop define an upper gap that allows insertion of the upper portion of the firearm magazine.

In another aspect, the lower holder can include a retaining arm, a side stop, and a bottom stop. The retaining arm and the side stop define a lower gap that allows insertion of the lower portion of the firearm magazine.

In another aspect, the magazine holder can include an attachment device for attaching the magazine holder to an article of clothing of a user.

These and other aspects, features, implementations, and advantages of the present disclosure will become more readily apparent from the attached drawings and the detailed description of the exemplary embodiments, which follow.

BRIEF DESCRIPTION OF THE DRAWINGS

The exemplary embodiments of the disclosure will hereinafter be described in conjunction with the appended drawings provided to illustrate and not to limit the present disclosure, where like designations denote like elements, and in which.

Like reference numerals refer to like parts throughout the several views of the drawings.

DETAILED DESCRIPTION

The following detailed description is merely exemplary in nature and is not intended to limit the described embodiments or the present disclosure and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations and aspects described below are exemplary implementations and exemplary aspects provided to enable persons skilled in the art to make or use the embodiments of the present disclosure and are not intended to limit the scope of the present disclosure, which is defined by the claims.

Figure 1:
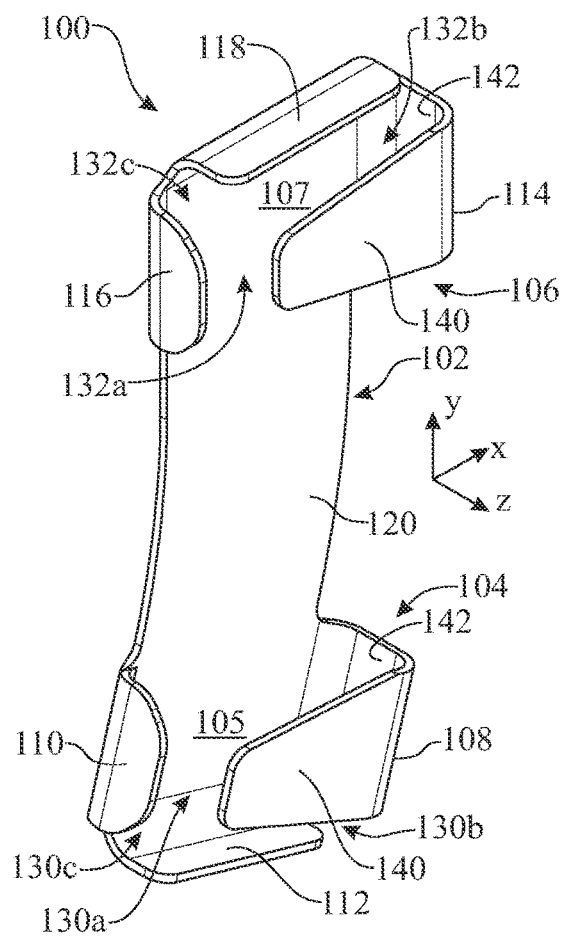
FIG. 1 presents a front, perspective view of a magazine holder in accordance with an embodiment of the present disclosure.

For purposes of description herein, the terms "upper", "lower", "top", "bottom", "left", "rear", "right", "front", "vertical", "horizontal", and derivatives thereof shall relate to the embodiments as oriented relative to an x, y, z coordinate system as illustrated in FIG. 1. These terms are relative terms and not intended to limit functionality and operation of the embodiments of the present disclosure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the concepts defined in the appended claims. Hence, specific dimensions and other physical characteristics relating to the embodiments disclosed herein are not to be considered as limiting, unless the claims expressly state otherwise.

Shown throughout the figures, the present disclosure is directed toward a magazine holder that allows quick and easy reloading of a firearm. The magazine holder includes a backplate with upper and lower holders. The upper and lower holders include flexible arms and retaining tabs. The flexible arms are designed to flex open and closed so that a magazine is be rotated to clear the retaining tabs. This rotating motion naturally aligns the orientation of the magazine with the receiver of the firearm. Additionally, the upper and lower holders create optimal hand placement to not only grasp the magazine, remove the magazine, insert the magazine into the receiver of the firearm, but be in the correct position to simultaneously press a bolt release button, thereby returning the weapon to a ready state much faster. This movement reduces wasted movement and unnatural straining, thereby providing an economy of motion. Moreover, because the magazine rotates out of the magazine holder, the distance needed between adjacent magazine holders is reduced thereby allowing for the positioning of a series of magazine holders in a line. The upper and lower holders also secure a magazine on all sides: top, bottom, front, back, and both left and right sides.

Referring initially to FIGS. 1-5, a magazine holder 100 is illustrated in accordance with an exemplary embodiment of the present disclosure. While FIGS. 1-5 illustrate various components contained in the magazine holder 100, it should be noted that FIGS. 1-5 illustrate one example of a magazine holder of the present disclosure, and additional components can be added and existing components can be removed.

In embodiments, the magazine holder 100 operates to hold and store a firearm magazine for quick and easy access. As described herein, a firearm magazine can include any device or system that holds ammunition for a firearm, for example, a handgun, a rifle, a sub-machinegun, etc. As illustrated in FIG. 1, the magazine holder 100 includes a backplate 102, a lower holder 104, and an upper holder 106. The backplate 102 operates as structural support for the magazine holder 100. The backplate 102 can be constructed of a rigid or semi-rigid material such as a metal, metal alloy, synthetic or semi-synthetic polymers, and combinations thereof. The synthetic or semi-synthetic polymers can include molded plastics materials such as ABS resins, acetyl resins, nylon resins, urethane resins, or high-impact polystyrene resins. The lower holder 104 operates to removably (detachably) secure a lower portion of a firearm magazine against a front surface 120 of the backplate 102. The upper holder 106 operates to removably (detachably) secure an upper portion of a firearm magazine against the front surface 120 of the backplate 102.

In embodiments, the lower holder 104 includes a retaining arm 108, a side stop 110, and a bottom stop 112. A holding space 105 may be defined between the front surface 120 of the back plate 102, the retaining arm 108, the side stop 110 and the bottom stop 112; in some embodiments, the holding space 105 can be designed to be approximately a same width as a firearm magazine. The retaining arm 108 and the side stop 110 may be spaced apart, as shown, such that a first gap 130a is defined by and between the spaced-apart retaining arm 108 and side stop 110. Alternatively or additionally, and preferably additionally, the retaining arm 108 and bottom stop 112 may be spaced apart, as shown, such that a second gap 130b is defined by and between the spaced-apart retaining arm 108 and bottom stop 112. Alternatively or additionally, and preferably additionally, the side stop 110 and bottom stop 112 may be spaced apart, as shown, such that a third gap 130c is defined by and between the spaced-apart side stop 110 and bottom stop 112. For instance, in the present embodiment, all three gaps 130a, 130b, 130c are present and are interconnected forming a Y-shaped gap. The first gap 130a may be configured to allow a lower portion of the firearm magazine to enter the holding space 105. The retaining arm 108 can be constructed of a semi-flexible material that allows the retaining arm 108 to flex or move positively and negatively along a z-direction or transverse direction z, e.g., move towards and away from the backplate 102. For example, the retaining arm 108 can be constructed of a metal, metal alloy, synthetic or semi-synthetic polymer, or combination thereof. Similarly, the side stop 110 and the bottom stop 112 can be can be constructed of a metal, metal alloy, synthetic or semi-synthetic polymer, or combination thereof. The retaining arm 108 may deform to increase the width of the first gap 130a, thereby allowing a firearm magazine to be inserted and withdrawn from the holding space 105 through the first gap 130a, and to decrease the width of the first gap 130a, to thereby retain the magazine within the holding space 105, as described below in further detail. Once the magazine is inserted, the bottom stop 112 may prevent the magazine from moving in a generally vertical direction y or y-direction, generally perpendicular to the transverse direction z.

In embodiments, the upper holder 106 includes a retaining arm 114, a side stop 116, and a top stop 118. A holding space 107 may be defined between the front surface 120 of the back plate 102, the retaining arm 114, the side stop 116, and the top stop 118; in some embodiments, the holding space 107 can be designed to be approximately a same width as a firearm magazine. The retaining arm 114 and the side stop 116 may be spaced apart, as shown, such that a first gap 132a is defined by and between the spaced-apart retaining arm 114 and side stop 116. Alternatively or additionally, and preferably additionally, the retaining arm 114 and top stop 118 may be spaced apart, as shown, such that a second gap 132b is defined by and between the spaced-apart retaining arm 114 and top stop 118. Alternatively or additionally, and preferably additionally, the side stop 116 and top stop 118 may be spaced apart, as shown, such that a third gap 132c is defined by and between the spaced-apart side stop 116 and top stop 118. For instance, in the present embodiment, all three gaps 132a, 132b, 132c are present and are interconnected forming a Y-shaped gap. The first gap 132a may be configured to allow an upper portion of the firearm magazine to enter the holding space 107. The retaining arm 114 can be constructed of a semi-flexible material that allows the retaining arm 114 to flex or move in the positive and negative z-direction, e.g., move towards and away from the backplate 102. For example, the retaining arm 114 can be constructed of a metal, metal alloy, synthetic or semi-synthetic polymer, or combination thereof. Similarly, the side stop 116 and the top stop 118 can be constructed of a metal, metal alloy, synthetic or semi-synthetic polymer, or a combination thereof. The retaining arm 114 may deform to increase the width of the first gap 132a, thereby allowing a firearm magazine to be inserted and withdrawn from the holding space 107 through the first gap 132a, and to decrease the width of the upper gap 132a, to thereby retain the magazine within the holding space 107, as described below in further detail. Once inserted, the top stop 118 may prevent the firearm's magazine from moving in the y-direction. Additionally, the top stop 118 may operate to prevent ammunition from ejecting from the top of the firearm's magazine once inserted into the magazine holder.

Figure 2:
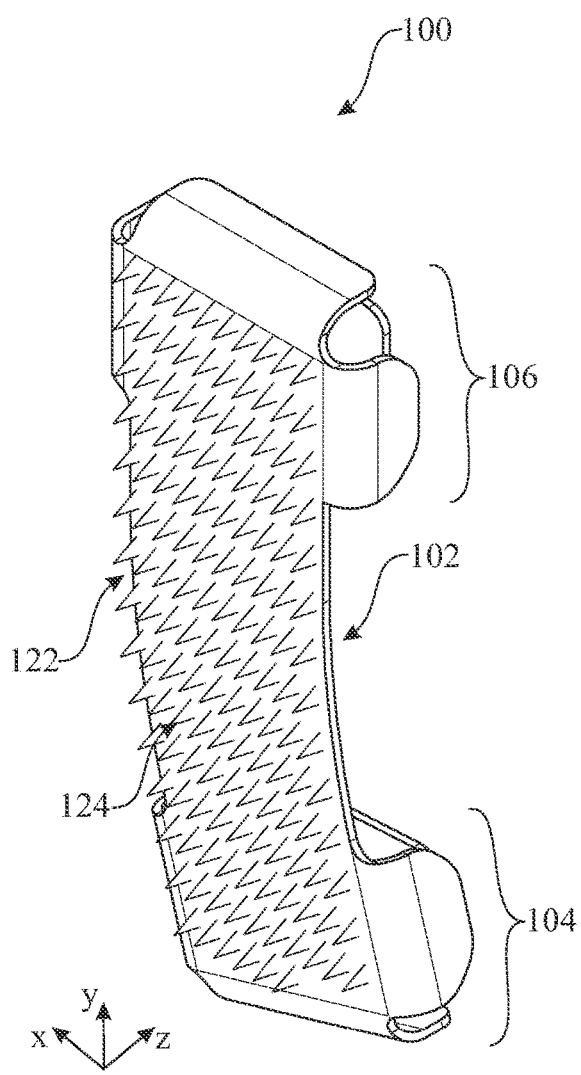
FIG. 2 presents a rear, perspective view of the magazine holder of FIG. 1.

As illustrated in FIG. 2, which is a rear, perspective view, the magazine holder 100 can include an attachment device 124 that is coupled to or provided at a rear surface 122 of the magazine holder 100. The attachment device 124 operates to attach the magazine holder 100 to a surface that allows easy access by a user of a firearm. For example, as described below in further detail, the attachment device 124 can allow the magazine holder 100 to be attached to the clothing of a user of the firearm in a position that is easily accessible by the user. In some embodiments, the attachment device 124 can include attachment devices such as hook-and-loop fasteners, mechanical clasps, mechanical snaps, fixed connections such as screws and bolts, and the like.

Figure 3:
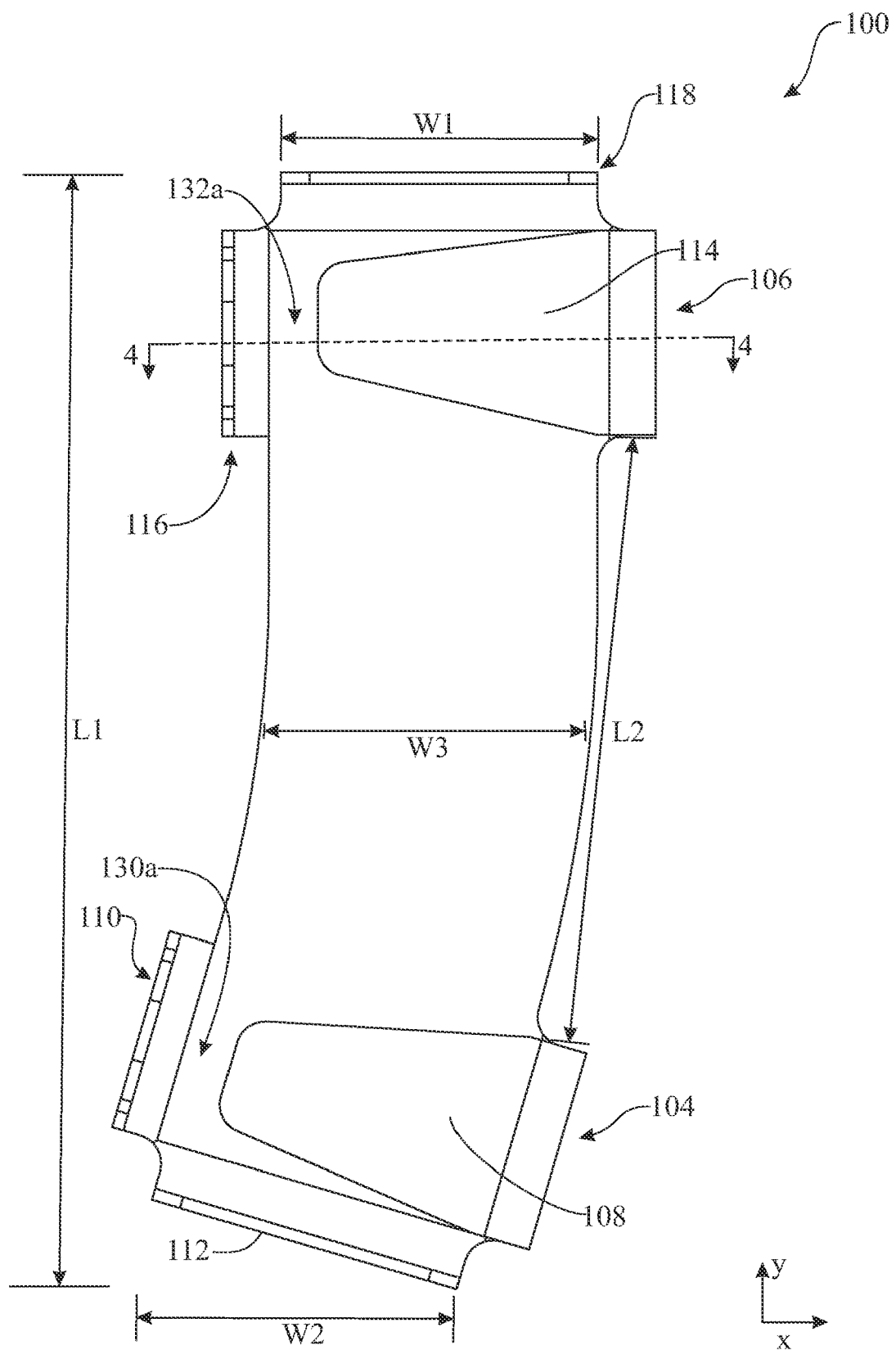
FIG. 3 presents a front elevation view of the magazine holder of FIG. 1.
Figure 4:
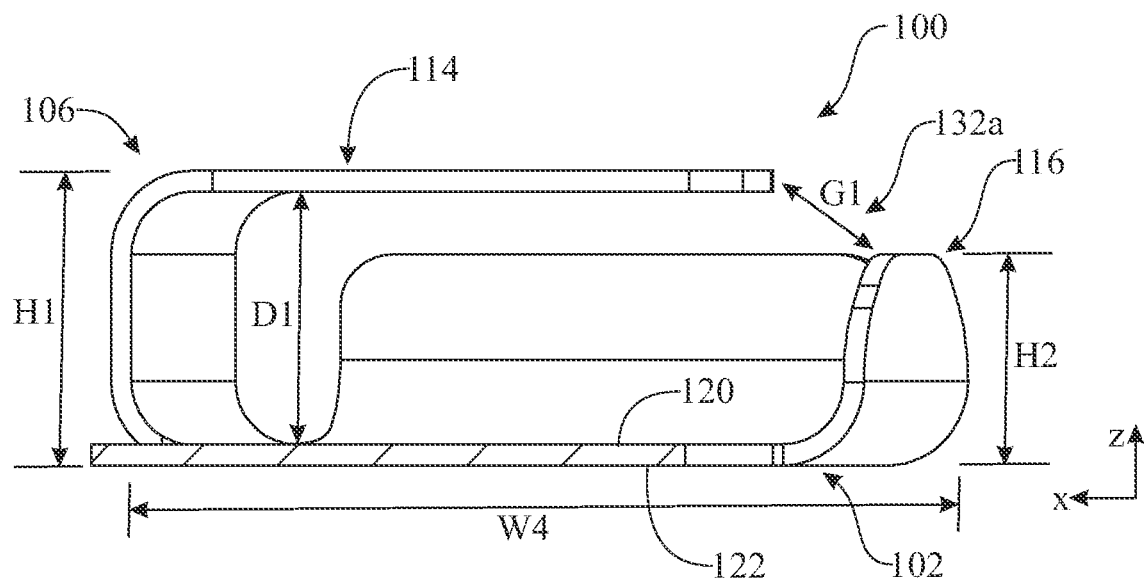
FIG. 4 presents a cross-sectional, top plan view of the magazine holder of FIG. 1, the cross section taken along section plane 4-4 indicated in FIG. 3.
Figure 5:
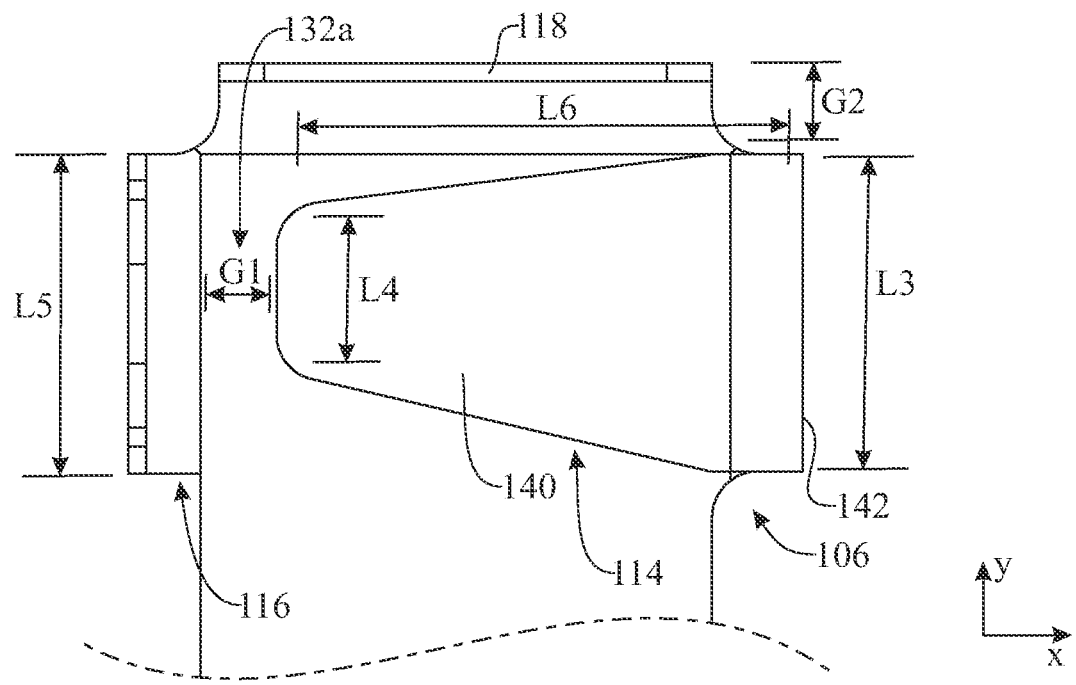
FIG. 5 presents an enlarged, front elevation view of a holder of the magazine holder of FIG. 1.

In embodiments, the magazine holder 100 can be constructed in various shapes and dimensions to match a type of firearm magazine that is held by the magazine holder 100. In some embodiments, the backplate 102 of the magazine holder 100 can approximate a shape and size of a firearm magazine. The illustrations of FIGS. 3, 4, and 5 depict various dimensions for one example of the magazine holder 100 in accordance with an exemplary embodiment of the present disclosure. As illustrated in the front elevation view of FIG. 3, the magazine holder 100 can be constructed to approximate a shape of a magazine for a rifle. That is, the backplate 102 can have a curved, rectangular shape. As shown in FIG. 3, the backplate 102 can have a length L1, in the y-direction. The backplate 102 can have a width W1, in the x-direction, at the top stop 118. The backplate 102 can have a width W2, in the x-direction, at the bottom stop 112. The backplate 102 can have a width W3, in the x-direction, at a mid-point of the backplate 102. The upper holder 106 and the lower holder 104 can be spaced apart a distance L2.

As shown in FIG. 4, the upper holder 106 can be designed having dimensions that allow the upper portion of a firearm magazine to be detachably secured against the backplate 102. As illustrated, the magazine holder 100 can have an outer width W4, from an outer portion of the side stop 116 and the retaining arm 114. The retaining arm 114 can have an outer height H1, from the rear surface 122 of the backplate 102 to a front or outer surface of the retaining arm 114. The retaining arm 114 can have an inner height, DI, from the front surface 120 of the backplate 102 to the inner surface of the retaining arm 114. The side stop 116 can have an outer height H2, from the rear surface 122 of the backplate 102 to the opposite, front end of the side stop 116. The first gap 132a can have a width G1, between the end of the retaining arm 114 and the end of the side stop 116.

As shown in FIG. 5, the retaining arm 114 can have an end portion 140 arranged frontward of and spaced apart with the front side 120 of the back plate 102, and a side portion 142 connected to and extending frontward from the back plate 102 and carrying the end portion 140. The side portion 142 and end portion 140 may form an L-shaped arrangement, as best shown in FIG. 1. The end portion 140 of the retaining arm 114 may have a quadrilateral shape, for example, a trapezium with parallel sides having a length L3, at a connection to the backplate 102 (i.e. at the side portion 142), and a length L4, at the end of the retaining arm 114 (i.e. at the end of the end portion 140 opposite to the side portion 142) and non-parallel sides having a length L6. The side stop 116 can have a length L5, in the y-direction. The top stop 118 can be spaced a distance G2, from the retaining arm 114 at the second gap 132b. While not illustrated, the lower holder 104 can have dimensions similar to those described above in FIGS. 3, 4, and 5. Furthermore, it should be noted that the retaining arm 108 of the lower holder 104 may have a similar or same side portion 142 and end portion 140 construction as the retaining arm 114, as shown in FIG. 1.

Figure 6:
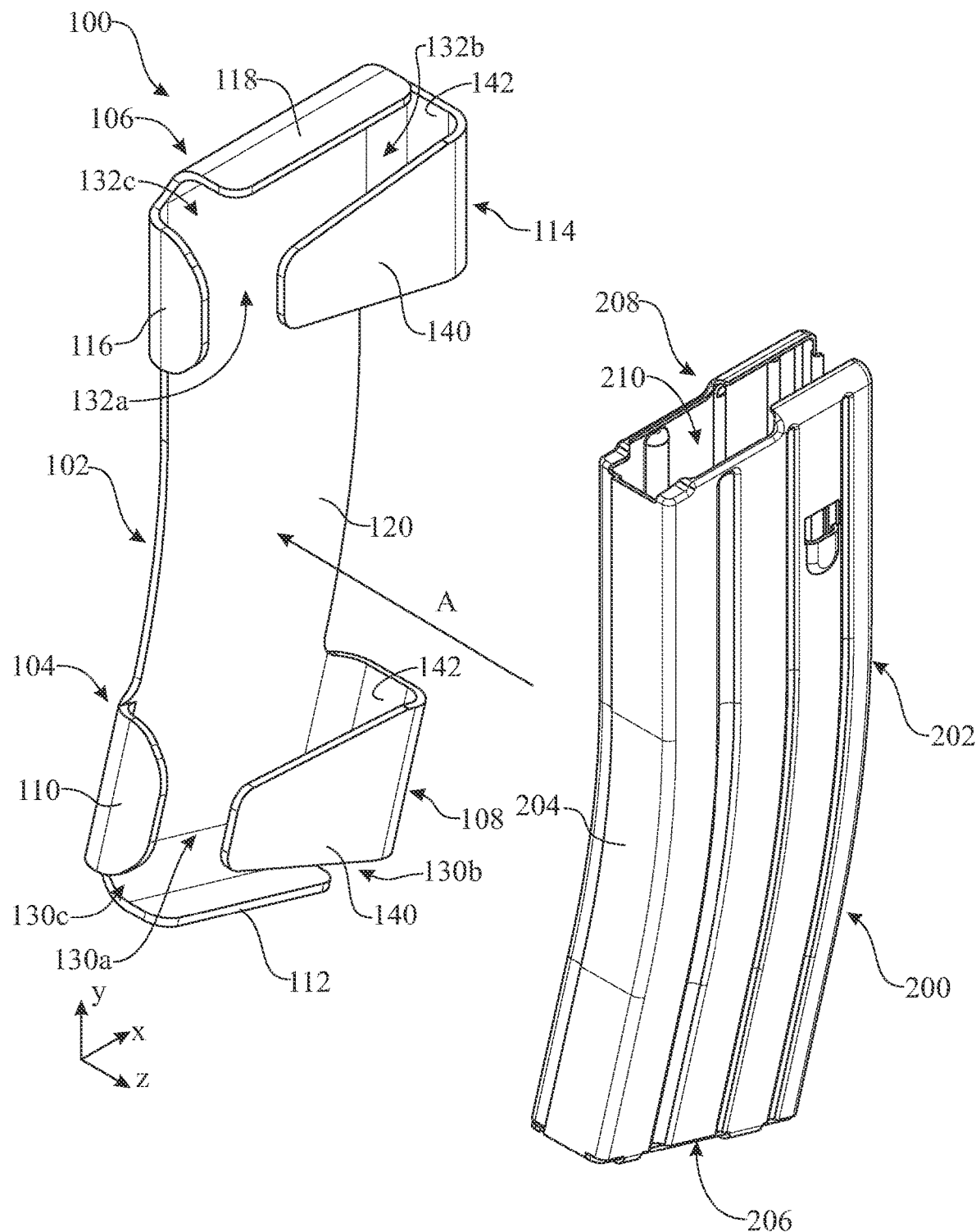
FIG. 6 presents a first step of a method of operation of the magazine holder of FIG. 1 in accordance with an embodiment of the present disclosure.
Figure 7:
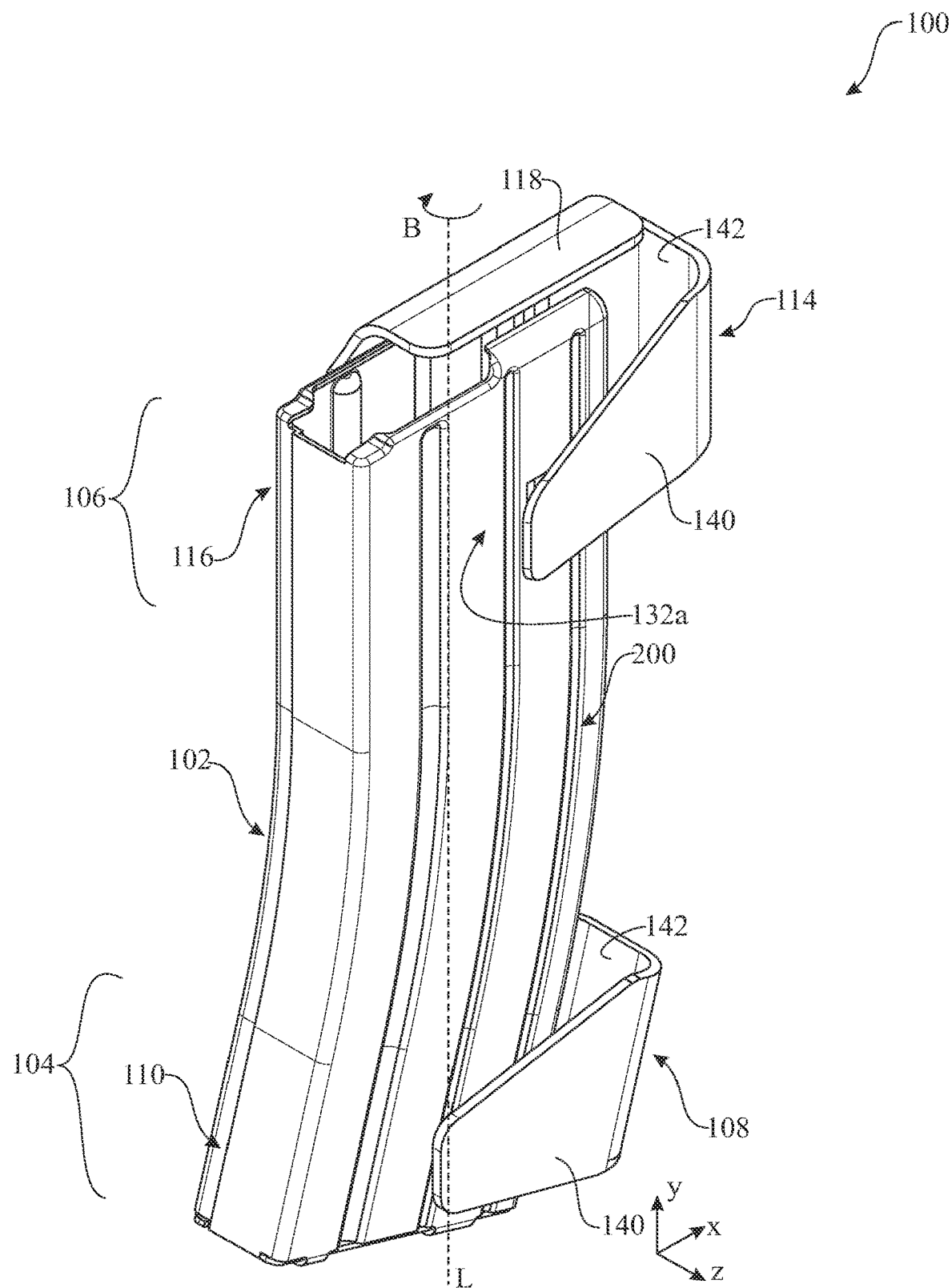
FIG. 7 presents a second step of a method of operation of the magazine holder of FIG. 1 in accordance with an embodiment of the present disclosure.
Figure 8:
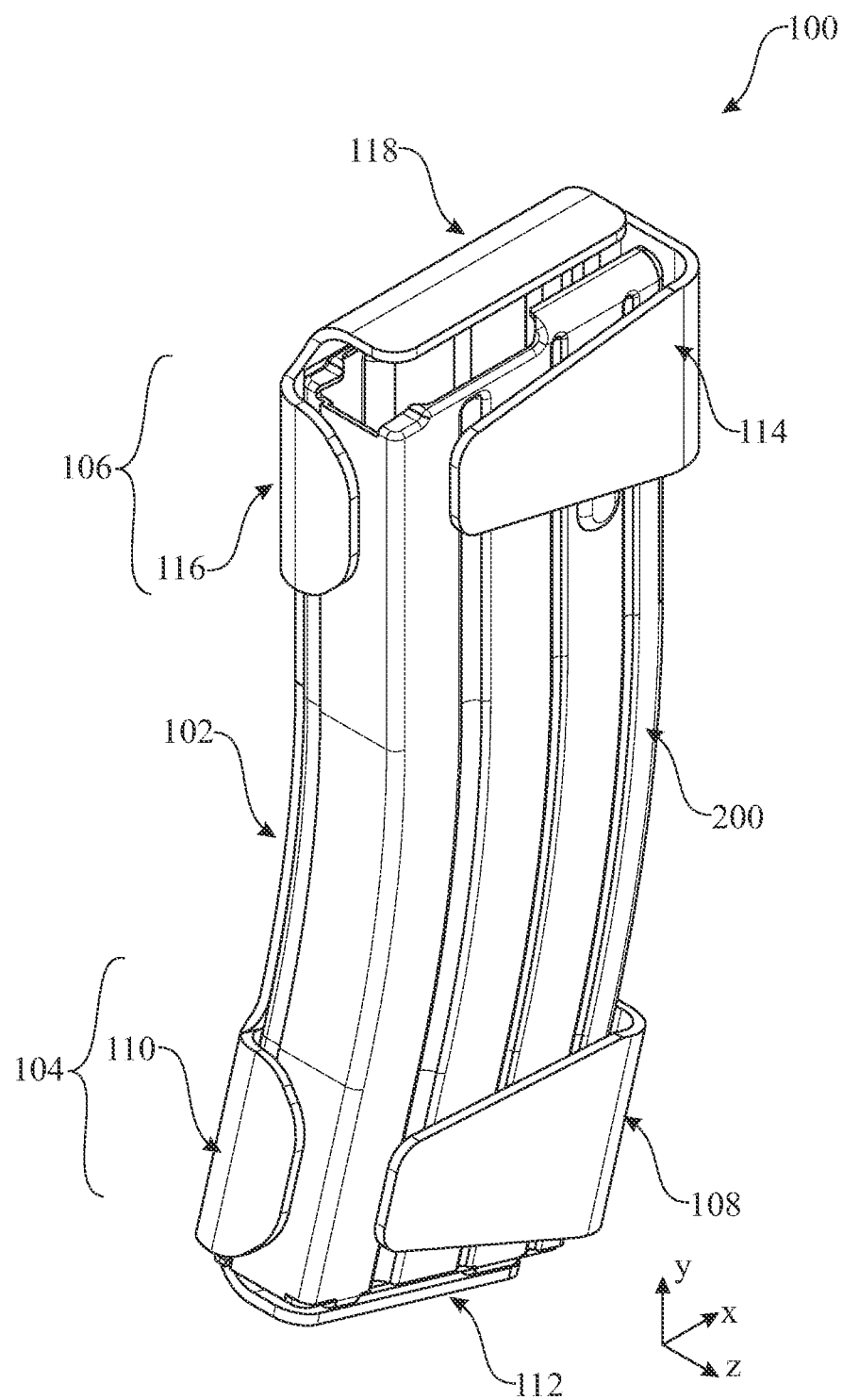
FIG. 8 presents a third step of a method of operation of the magazine holder of FIG. 1 in accordance with an embodiment of the present disclosure.

In any embodiment, the values for the dimensions described above in FIGS. 3, 4, and 5 can be selected based on a type of firearm magazine held by the magazine holder 100. The illustrations of FIGS. 6, 7, and 8 are perspective views showing an operation of the magazine holder 100 with a firearm magazine 200 in accordance with an exemplary embodiment of the present disclosure. As illustrated, the firearm magazine 200 can have a curved shape with a convex side surface 202, a concave side surface 204 arranged generally opposite to the convex side surface 202, a bottom surface 206, and a top surface 208. The top surface 208 includes an opening 210 from which ammunition can be loaded into the body of the firearm magazine 200.

As shown in FIG. 6, to load the firearm magazine 200 into the magazine holder 100, the firearm magazine 200 is positioned adjacent to the front surface 120 of the backplate 102 with the firearm magazine 200 being oriented upward such that the top surface 208 of the firearm magazine 200 is adjacent to or transversely aligned with the upper holder 106 and the bottom surface 206 of the firearm magazine 200 is adjacent to or transversely aligned with the lower holder 104. Then, the firearm magazine 200 is moved toward the magazine holder 100 as indicated by arrow A.

As shown in FIG. 7, to insert the firearm magazine 200 into the magazine holder 100, the top surface 208 of the firearm magazine 200 is aligned, in the y-direction, with the top stop 118, and the bottom surface 206 is aligned, in the y-direction, with the bottom stop 112. The convex side surface 202 can be inserted into the first gap 130a of the lower holder 104 and the first gap 132a of the upper holder 106. As the firearm magazine 200 is inserted, the retaining arm 108 of the lower holder 104 and the retaining arm 114 of the upper holder 106 can flex outward, in the z-direction, allowing the firearm magazine 200 to enter the lower holder 104 and the upper holder 106. To assist in the flexing, the firearm magazine 200 can be rotated about a longitudinal axis L of the firearm magazine 200, as indicated by arrow B. The rotating firearm magazine 200 may push against the free end of the end portion 140 of the retaining arm 114 and exert a torque on the end portion 140 which causes the end portion 140, and optionally the side portion 142, to flare or pivot outward with respect to the back plate 102, thereby widening the first gap 132a. It should be noted that a similar or same operation may be carried out at the lower holder 104.

As shown in FIG. 8, the firearm magazine 200 is inserted into the holding spaces 105 and 107 of the lower holder 104 and the upper holder 106, respectively, until the firearm magazine 200 is received within the magazine holder 100. In some embodiments, the retaining arms 108 and 114, and optionally the side stops 110 and 116, bottom stop 112 and top stop 118, may be elastically deformable and biased to recover an initial rest position or undeformed position (shown in FIG. 6). In this way, when the firearm magazine 200 is received within the magazine holder 100, the lower and upper holders 104 and 106 may elastically compress against the firearm magazine 200. The convex side surface 202 of the firearm magazine 200 may abut a respective inner surface of the retaining arm 108 and the retaining arm 114, and the concave side surface 204 may abut a respective inner surface of the side stop 110 and the side stop 116. As shown, the top stop 118 and the bottom stop 112 prevent the firearm magazine 200 from moving in the y-direction. Additionally, the top stop 118 prevents ammunition from ejecting from the top surface 208 of the firearm magazine 200.

Figure 9:
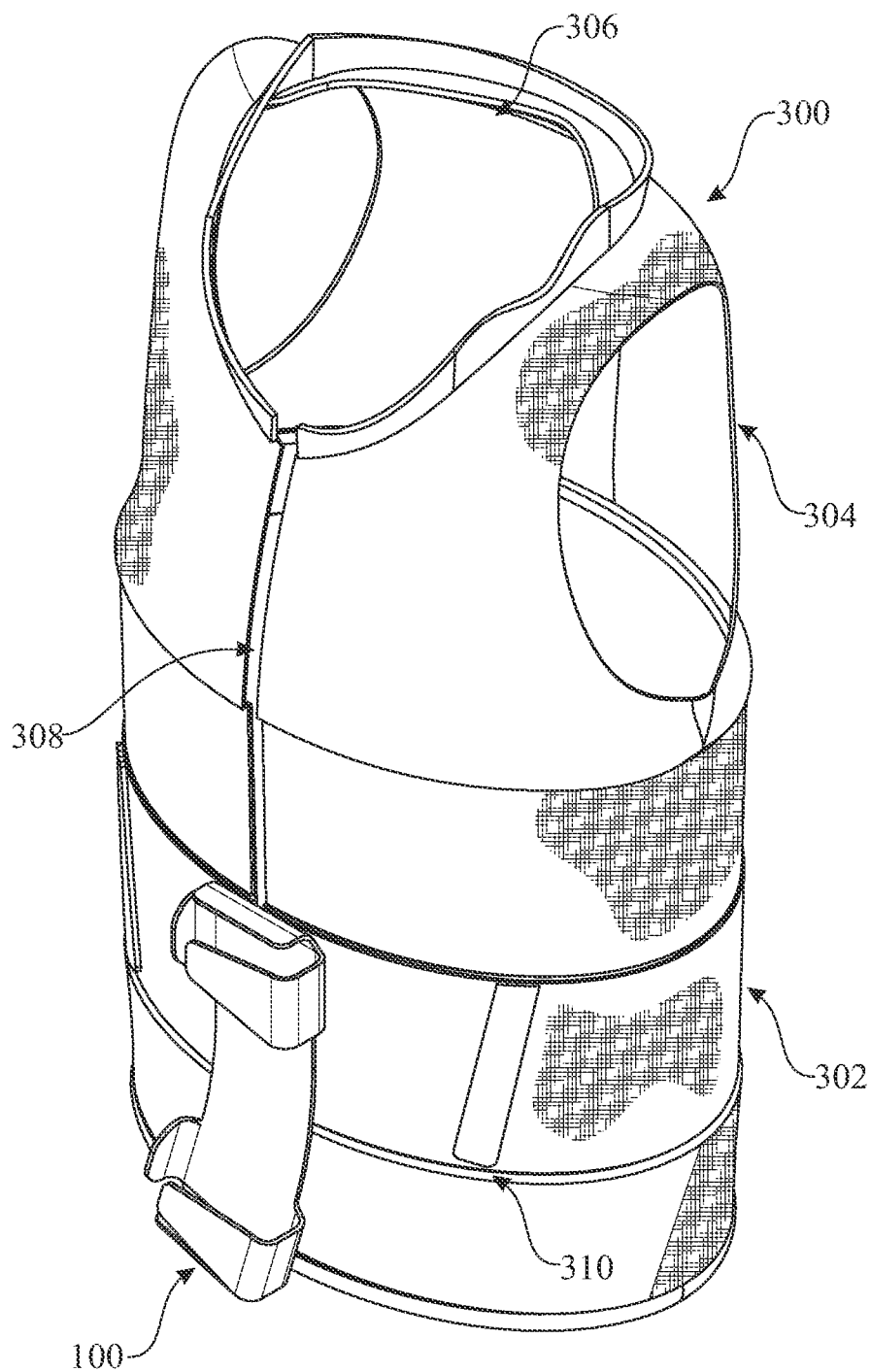
FIG. 9 presents a front, perspective view of a positioning of the magazine holder of FIG. 1 on a tactical vest, in accordance with an embodiment of the present disclosure.

As discussed above, the magazine holder 100 can be attached to an article of clothing of a user of a firearm. The illustration of FIG. 9, for instance, shows a positioning of the magazine holder 100 in accordance with an exemplary embodiment of the present disclosure. While FIG. 9 illustrates various components, it should be noted that FIG. 9 illustrates one example of a positioning of a magazine holder of the present disclosure, and additional components can be added and existing components can be removed.

As illustrated, the magazine holder 100 can be attached to body armor or a tactical vest, hereinafter referred to as vest 300. The vest 300 includes a body 302 with arm openings 304 and a neck opening 306. The body 302 can also include a front opening 308 that allows the user to open and close to equip the vest 300. The body 302 can also include pockets 310 positioned on the body of the vest 300. The magazine holder 100 can be attached to the body 302 of the vest 300 adjacent to or near the front opening 308 at a vertical position that is adjacent to or near a bottom of the vest 300. This positioning places the magazine holder 100 at a location that is near a firearm being used thereby allowing quick and easy loading and reloading of the firearm, as described below.

Figure 10:
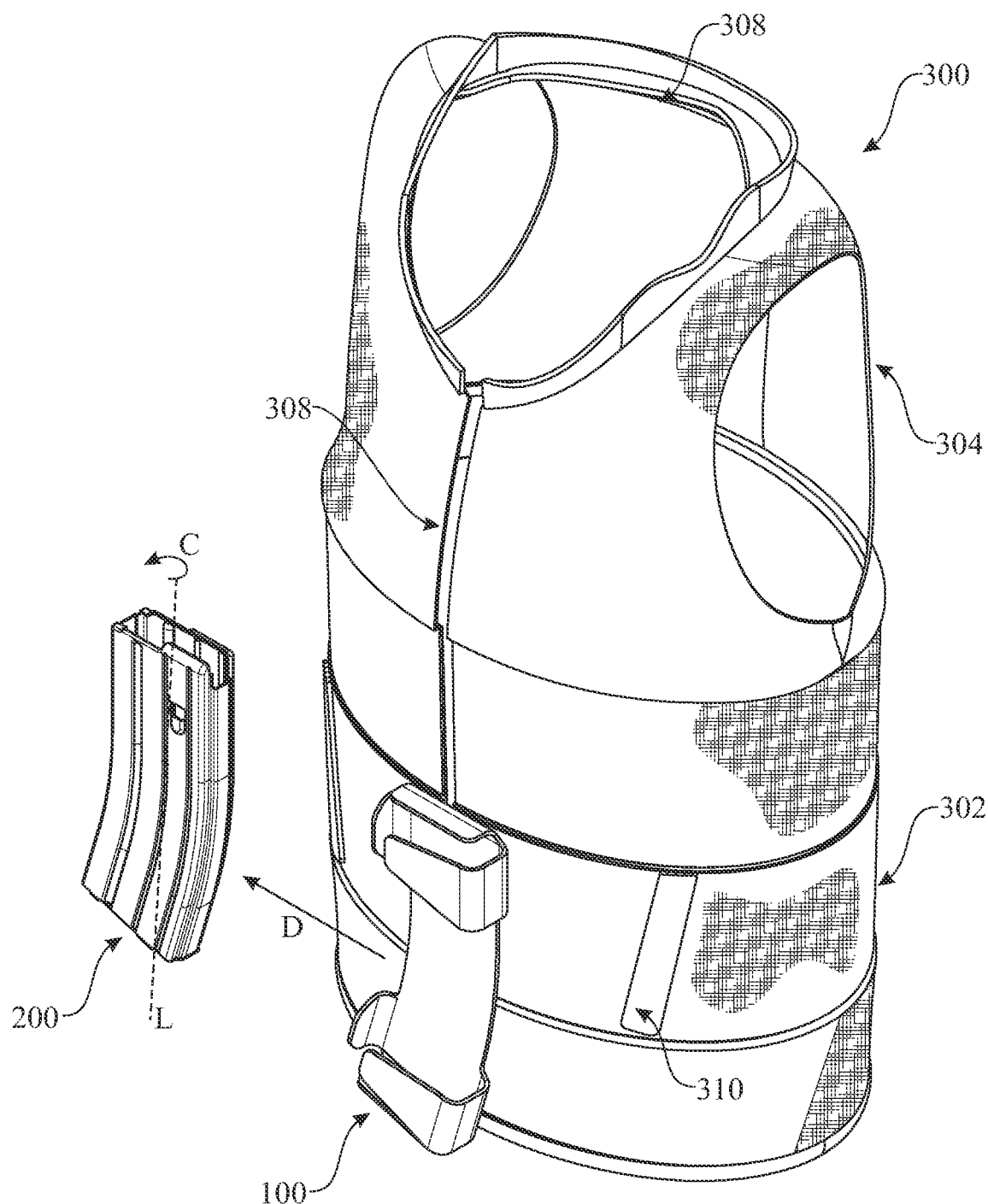
FIG. 10 presents a front, perspective view depicting removal of a firearm magazine from the magazine holder and vest of FIG. 9.
Figure 11:
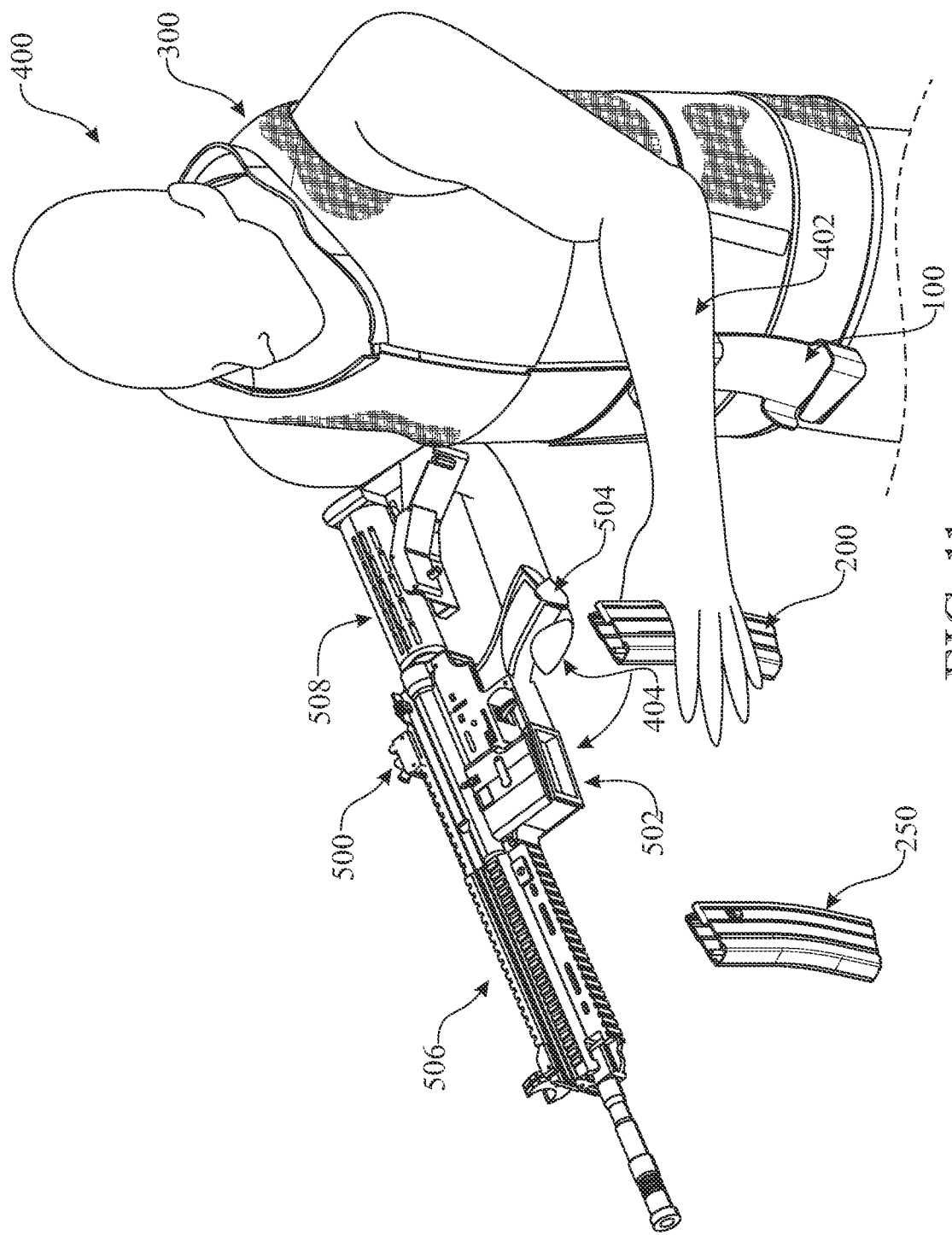
FIG. 11 presents a front, perspective view of the firearm magazine being used with a firearm while the magazine holder remains attached to the vest.

The illustrations of FIGS. 10 and 11 are perspective views that illustrate a reloading operation of the magazine holder 100 with the firearm magazine 200 in accordance with an exemplary embodiment of the present disclosure. While FIGS. 10 and 11 illustrate various components, it should be noted that said figures illustrate one example of an operation of a magazine holder of the present disclosure, and additional components can be added and existing components can be removed.

Initially, the magazine holder 100 can be positioned at a location of a vest 300 as described above with reference to FIG. 9, and the firearm magazine 200 may be inserted within the magazine holder 100 as was described heretofore with reference to FIGS. 6-8. As shown in FIG. 11, an operator 400 can be wearing the vest 300 and holding a rifle 500 with a right arm 404. The rifle 500 can include standard components of a rifle such as a receiver 502, a grip 504, a barrel 506, and a stock 508. The operator 400 can hold the rifle 500 in the right arm 404 by the grip 504.

To reload the rifle 500, the operator 400 can eject an empty magazine 250 from the rifle 500, for example, by depressing a magazine release button on the rifle 500. The magazine release button causes the magazine 250 to drop from the rifle 500 thereby clearing the receiver 502 to accept magazine 200. The operator 400 can retrieve the magazine 200 from the magazine holder 100 using a left arm 402. As shown in FIG. 10, to remove the magazine 200 from the magazine holder 100, the operator 400 can grasp the magazine 200 and pull the magazine 200 away from the magazine holder 100 while rotating in a counter-clockwise direction about a longitudinal axis L, as indicated by arrow C, and then pull out the magazine 200 from the magazine holder 100 as indicated by arrow D. The magazine 200 can exit the magazine holder 100 in an inverse process to that described in FIGS. 6, 7, and 8.

While the above operation is described as being performed by a right-handed operator, e.g., the rifle 500 being held in the right arm, the magazine holder 100 can be designed to accommodate a left-handed operator. In this embodiment, the components of the magazine holder 100 can be flipped such that the operator 400 would rotate the magazine 200 in the clockwise direction when removing the magazine 200 from the magazine holder 100.

As shown in FIG. 11, once removed, the magazine 200 can be loaded into the receiver 502 of the rifle 500. Because of the positioning of the magazine holder 100 and the operation to remove the magazine 200, the magazine 200 is positioned to be easily and quickly loaded into the receiver of the rifle. The magazine holder 100 is positioned on the vest 300 such that the magazine 200 is at an approximate vertical height of the receiver 502 of the rifle 500. Additionally, the action of removing the magazine 200 from the magazine holder 100 places the magazine in correct alignment for loading into the receiver 502 of the rifle 500. That is, as the magazine 200 is pulled and rotated out of the magazine holder 100, the concave side surface 204 of the magazine 200 is positioned forward thereby matching the correct alignment with the receiver 502 of the rifle 500.

Figure 12:
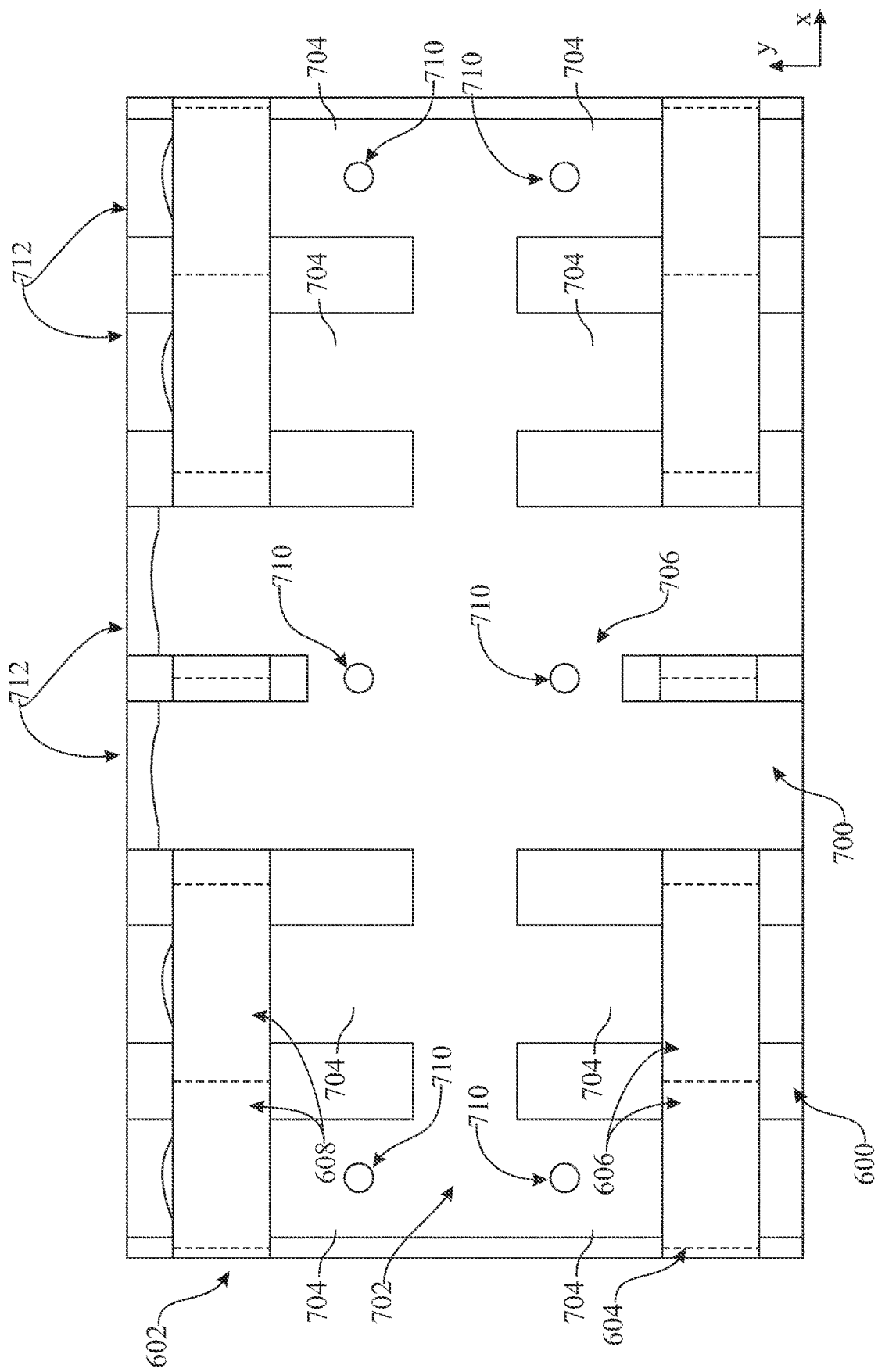
FIG. 12 presents a front elevation view of a mounting bracket for the magazine holder of FIG. 1.
Figure 13:
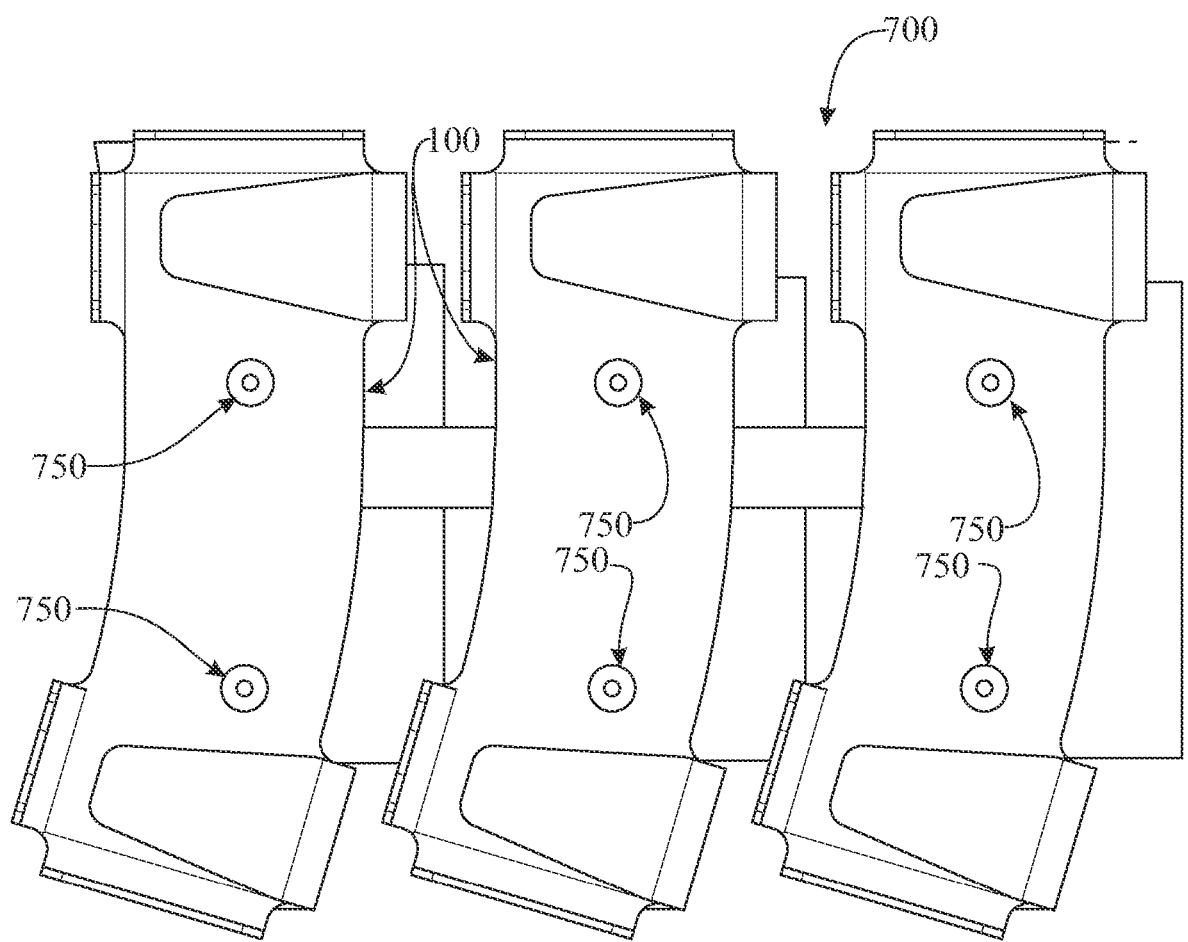
FIG. 13 presents a front elevation view of three magazine holders secured to the mounting bracket of FIG. 12.
Figure 14:
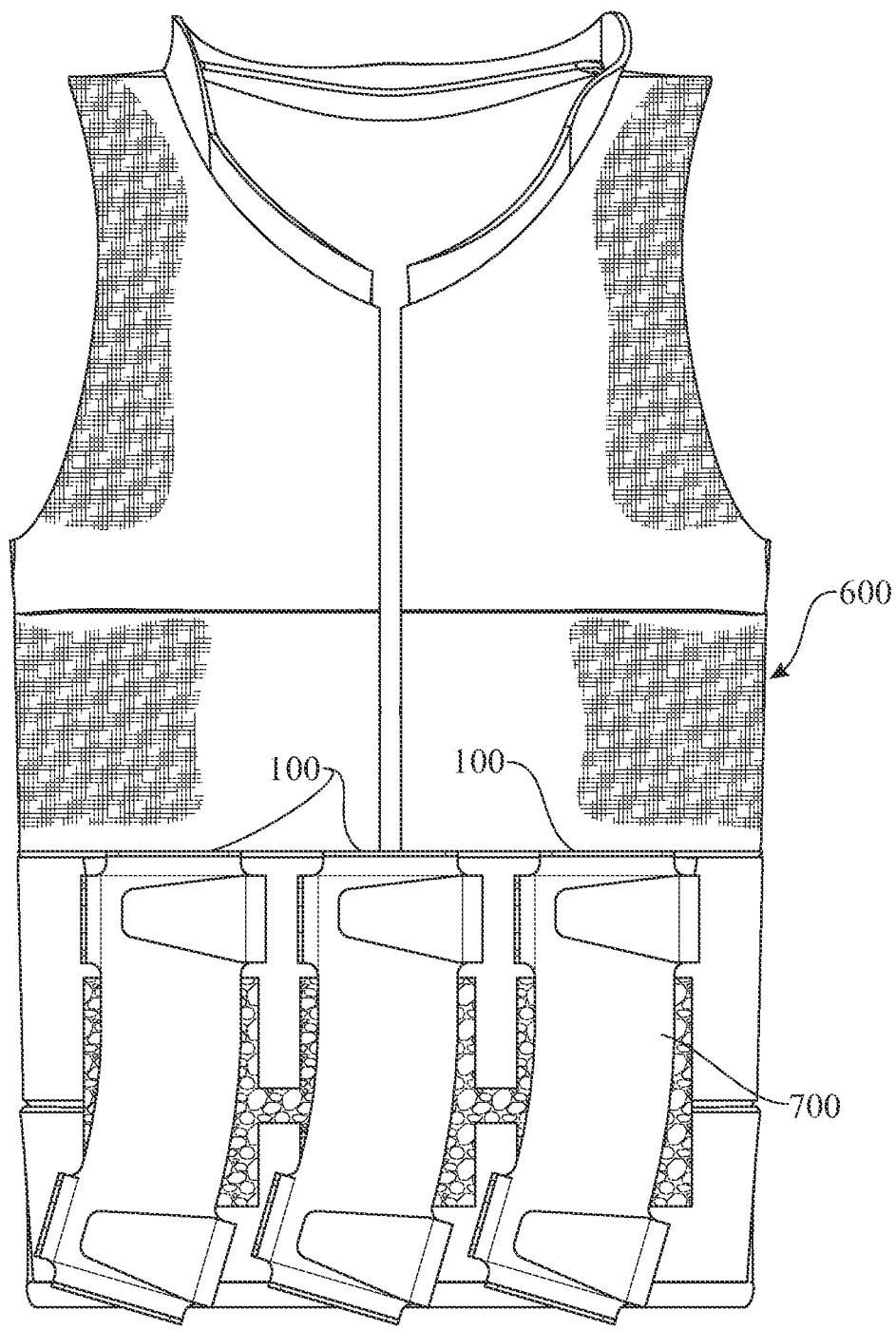
FIG. 14 presents a front elevation view of the mounting bracket and magazine holders of FIG. 13 secured to a tactical vest.

As discussed above, the magazine holder 100 can include an attachment device for attaching the magazine holder 100 to an article of clothing of an operator. The illustrations of FIGS. 12, 13, and 14 are perspective views that illustrate a mounting bracket 700 for the magazine holder 100, which can be used with a vest 600, in accordance with an exemplary embodiment of the present disclosure. While FIGS. 12, 13, and 14 illustrate various components, it should be noted that said figures illustrate one example of a mounting bracket for a magazine holder of the present disclosure, and additional components can be added and existing components can be removed.

As shown in FIG. 12, the mounting bracket 700 includes a central body 706 from which a horizontal bar 702 extends in the positive and negative x-direction. Vertical bars 704 extend from the central body 706 and the horizontal bar 702 in the positive and negative y-direction. The vertical bars 704 define spaces that can receive upper attachment devices 602 and lower attachment devices 604 of the vest 600. For example, the vest 600 can include several upper loops 606 and several lower loops 608. The vertical bars 704 of the mounting bracket 700 can be inserted into the upper loops 606 and the lower loops 608 thereby securing the mounting bracket 700 to the vest 600, as illustrated in FIG. 14. The mounting bracket 700 can also include upper stops 712 coupled to the tops of the vertical bars 704. The upper stops 712 can be configured as hooks that hold the mounting bracket 700 on the upper loops 606 and the lower loops 608.

The mounting bracket 700 includes several connection holes 710. The connection holes 710 are configured to receive one or more mounting devices for mounting one or more of the magazine holders 100 to the mounting bracket 700. For example, as illustrated in FIG. 13, mounting devices 750 can be used to secure three of the magazine holders 100 to the mounting bracket 700. The mounting devices 750 can be any mechanical device that secures the magazine holders 100 to the mounting bracket 700, for example, screws, bolts, rivets, and the like. It should be noted that, while FIGS. 13 and 14 illustrate three of the magazine holders 100 being attached to the mounting bracket 700, fewer or additional magazine holders 100 can be attached to the mounting bracket 700.

Figure 15:
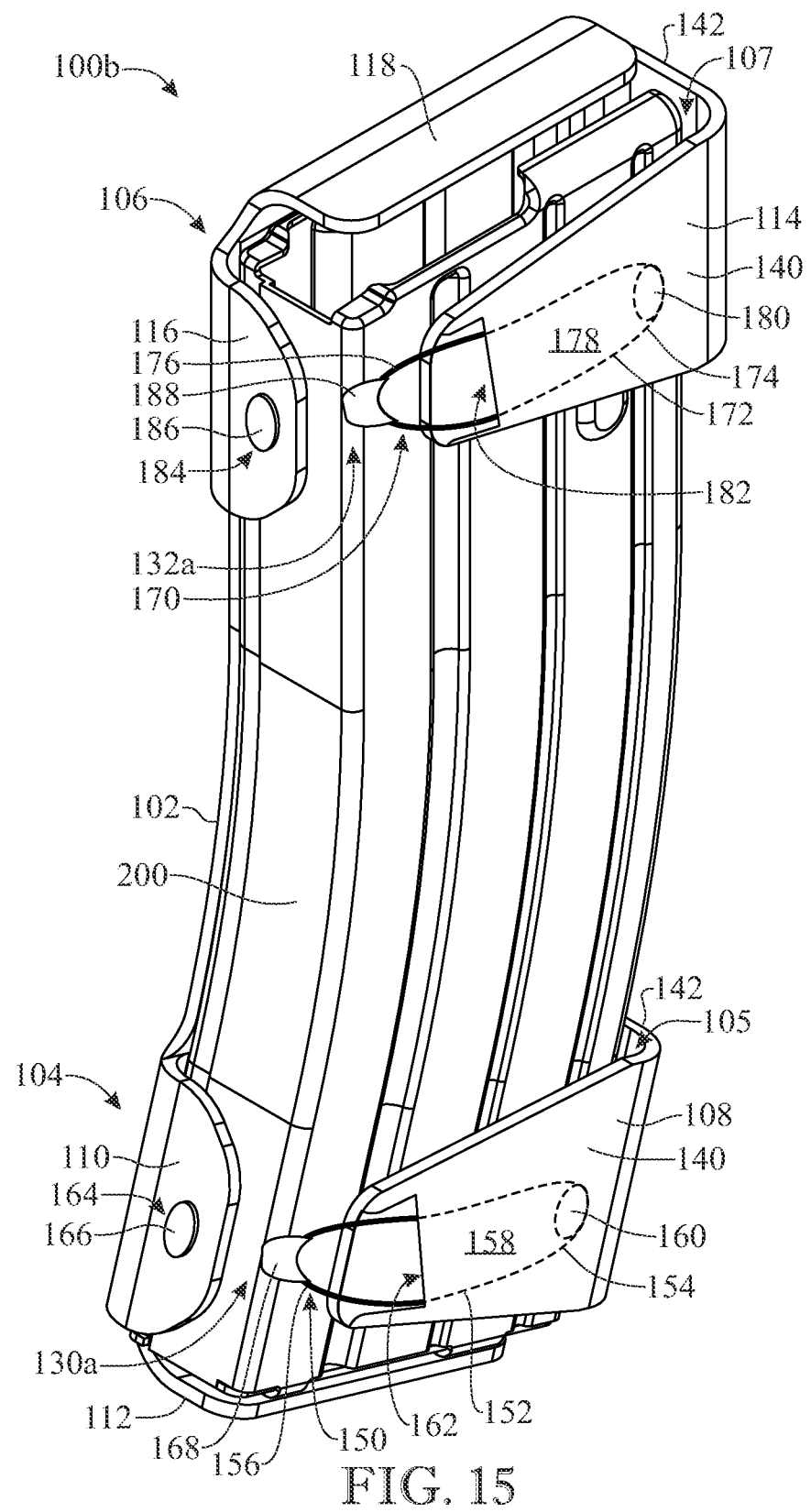
FIG. 15 presents a front perspective view of a magazine holder in accordance with a further embodiment of the invention, the magazine holder shown containing a magazine holder, wherein the magazine holder comprises upper and lower deployable fasteners, which are shown partially retracted within the retaining arms of the upper and lower holders, respectively.
Figure 16:
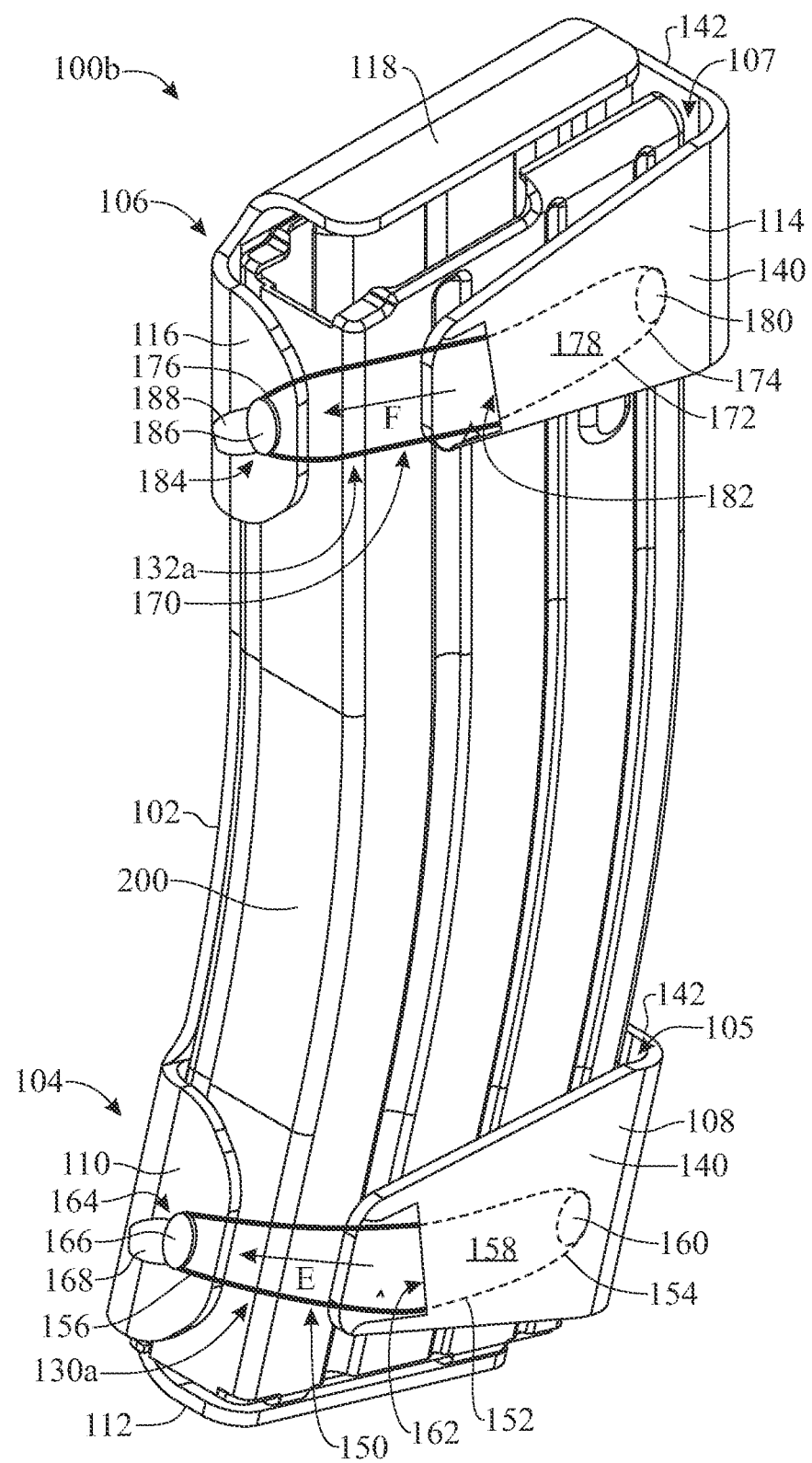
FIG. 16 presents a front perspective view of the firearm magazine and magazine holder of FIG. 15, the upper and lower deployable fasteners shown extended and secured to a respective knob provided in the side stops of each one of the upper and lower holders.

The illustrations of FIGS. 15 and 16 show a variation of the magazine holder, hereinafter referred to as magazine holder 100b, further comprising a pair of deployable fasteners 150, 170 configured to enhance the grip and securement of the firearm magazine 200 by the lower and upper holders 104 and 106. The pair of deployable fasteners 150, 170 is comprised of a lower deployable fastener 150 and an upper deployable fastener 170 arranged at the lower and upper holders 104 and 106, respectively. It should be noted that, while including both a lower deployable fastener 150 and an upper deployable fastener 170 is preferred, alternative embodiments are contemplated including only one deployable fastener of the upper and lower deployable fasteners, or including no deployable fasteners or a number of deployable fasteners greater than one at either one of the upper holder or the lower holder.

The lower deployable fastener 150 may be extendably carried by one of the retaining arm 108 and the side stop 110 of the lower holder 104, and may be extended to span the first gap 130a and connect to the other of the retaining arm 108 and the side stop 110. For example, the lower deployable fastener 150 depicted herein is carried by the retaining arm 108 and may be extended to span the first gap 130a and connect to the side stop 110. The lower deployable fastener 150 may include a fastener body 152 having a first end 154 and an opposite, second end 156. The first end 154 of the fastener body 152 may be preferably non-disconnectably secured to the retaining arm 108 and the second end 156 of the fastener body 152 may be preferably disconnectably attachable to the side stop 110. In some embodiments, the first end 154 may be connected to the end portion 140 of the retaining arm 108. Alternatively or additionally, the first end 154 may be connected to the retaining arm 108 within a cavity 158 formed in the retaining arm 108. For instance, in the depicted embodiment, the first end 154 is non-disconnectably secured to a protrusion 160 formed within cavity 158 formed inside the end portion 140 of the retaining arm 108. The fastener body 152 may extend outward of the cavity 158 through an end opening 162 of the cavity 158 and may be selectively and reversibly stretched or otherwise extended to span across the first gap 130a and to the side stop 110, as indicated by arrow E in FIG. 16.

The side stop 110 may include an outer receiver 164 configured for the attachment thereto of the second end 156 of the fastener body 152. In some embodiments, the outer receiver 164 may protrude outward. For example, in some embodiments, such as the present embodiment, the outer receiver 164 may be formed as a knob 166 protruding outward from the side stop 110. The second end 156 of the fastener body 152 may be looped around or fitted over the knob 166 to secure the second end 156 to the side stop 110.

In some embodiments, such as the present embodiment, the fastener body 152 may be elastically stretchable from a compressed or undeployed position, shown in FIG. 15, to a deployed or extended position, shown in FIG. 16. For instance and without limitation, the fastener body 152 may be made of rubber. When the fastener body 152 is arranged in the compressed or undeployed position, the second end 156 of the fastener body 152 may be disconnected from the knob 166 and the fastener body 152 may be elastically compressed to retract at least partially into the cavity 158 through the end opening 162. In the deployed or extended position, the fastener body 152 may instead be stretched out of the cavity 158 through the end opening 162, and further stretched to span across the first gap 130a and connect the second end 156 to the knob 166, as indicated by arrow E in FIG. 16, contributing to retain the lower portion of the firearm magazine 200 within the holding space 105 of the lower holder 104. In some embodiments, such as the present embodiment, the fastener body 152 may be formed as an elastically stretchable loop configured to loop around the protrusion 160 and knob 166. Alternatively or additionally, the second end 156 of the fastener body 152 may include a pull tab 168 configured to facilitate gripping the second end 156 to stretch the fastener body 152 from the undeployed position to the deployed position, and fitting the second end 156 over the knob 166 or disconnecting the second end 156 from the knob 166. In some embodiments, the pull tab 168 may further provide a reinforcement to the second end 156.

Similarly, the upper deployable fastener 170 may be extendably carried by one of the retaining arm 114 and the side stop 116 of the upper holder 106, and may be extended to span the first gap 132a and connect to the other of the retaining arm 114 and the side stop 116. For example, the upper deployable fastener 170 depicted herein is carried by the retaining arm 114 and may be extended to span the first gap 132a and connect to the side stop 116. The upper deployable fastener 170 may be constructed similarly or the same as the lower deployable fastener 170. For example, the upper deployable fastener 170 of the present embodiment includes a fastener body 172 having a first end 174 and an opposite, second end 176. The first end 174 of the fastener body 172 may be preferably non-disconnectably secured to the retaining arm 114 and the second end 176 of the fastener body 172 may be preferably disconnectably attachable to the side stop 116. In some embodiments, the first end 174 may be connected to the end portion 140 of the retaining arm 114. Alternatively or additionally, the first end 174 may be connected to the retaining arm 114 within a cavity 178 formed in the retaining arm 114. For instance, in the depicted embodiment, the first end 174 is non-disconnectably secured to a protrusion 180 formed within cavity 178 formed inside the end portion 140 of the retaining arm 114. The fastener body 172 may extend outward of the cavity 178 through an end opening 182 of the cavity 178 and may be selectively and reversibly stretched or otherwise extended to span across the first gap 132a and to the side stop 116, as indicated by arrow F in FIG. 16.

The side stop 116 may include an outer receiver 184 configured for the attachment thereto of the second end 176 of the fastener body 172. In some embodiments, the outer receiver 184 may protrude outward. For example, in some embodiments, such as the present embodiment, the outer receiver 184 may be formed as a knob 186 protruding outward from the side stop 116. The second end 176 of the fastener body 172 may be looped around or fitted over the knob 186 to secure the second end 176 to the side stop 116.

In some embodiments, such as the present embodiment, the fastener body 172 may be elastically stretchable from a compressed or undeployed position, shown in FIG. 15, to a deployed or extended position, shown in FIG. 16. For instance and without limitation, the fastener body 172 may be made of rubber. When the fastener body 172 is arranged in the compressed or undeployed position, the second end 176 of the fastener body 172 may be disconnected from the knob 186 and the fastener body 172 may be elastically compressed to retract at least partially into the cavity 178 through the end opening 182. In the deployed or extended position, the fastener body 172 may instead be stretched out of the cavity 178 through the end opening 182, and further stretched to span across the first gap 132a and connect the second end 176 to the knob 186, as indicated by arrow F in FIG. 16, contributing to retain the upper portion of the firearm magazine 200 within the holding space 105 of the upper holder 106. In some embodiments, such as the present embodiment, the fastener body 172 may be formed as an elastically stretchable loop configured to loop around the protrusion 180 and knob 186. Alternatively or additionally, the second end 176 of the fastener body 172 may include a pull tab 188 configured to facilitate gripping the second end 176 to stretch the fastener body 172 from the undeployed position to the deployed position, and fitting the second end 176 over the knob 186 or disconnecting the second end 156 from the knob 186. In some embodiments, the pull tab 188 may further provide a reinforcement to the second end 156.

Figure 17:
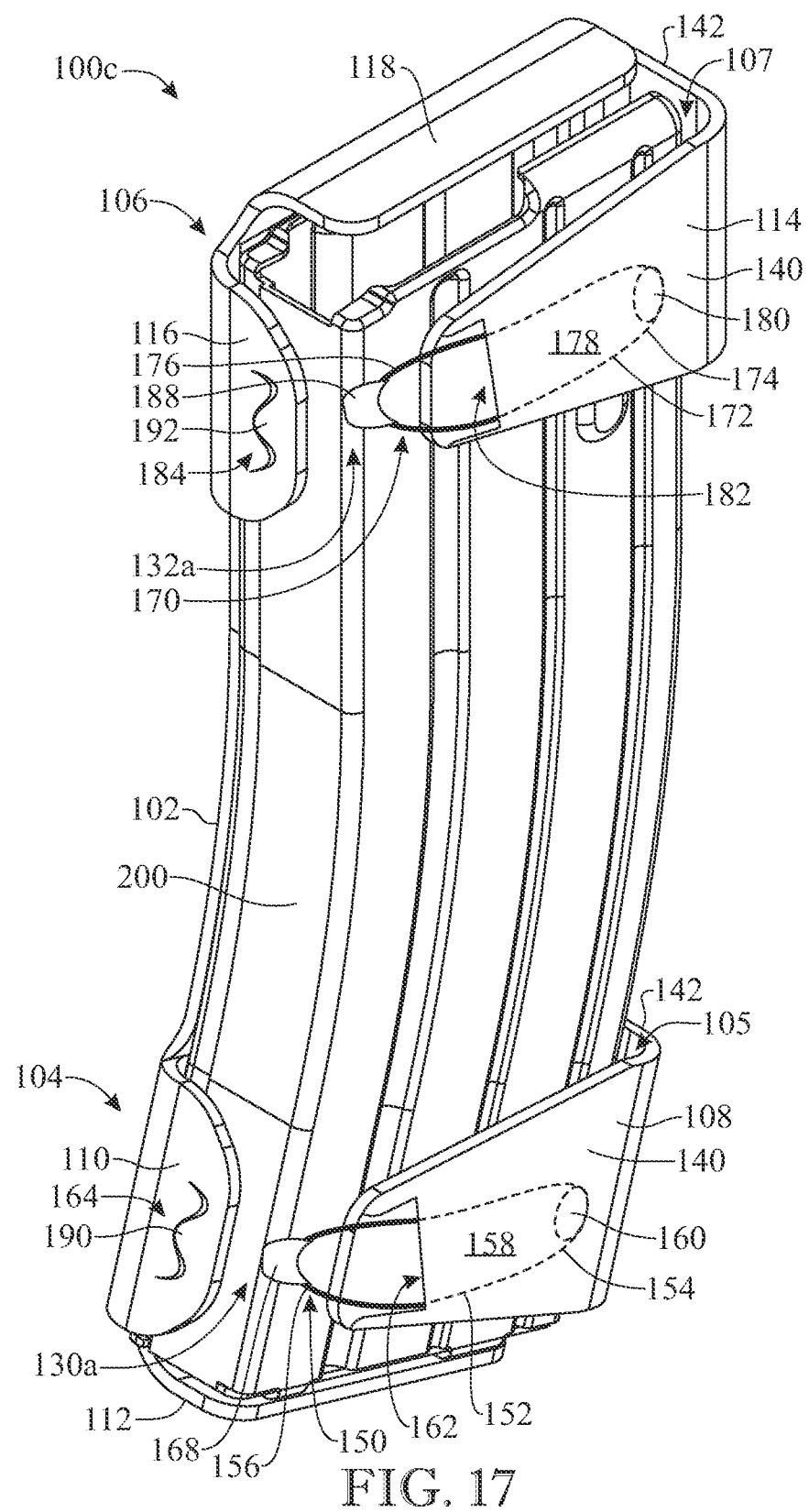
FIG. 17 presents a front perspective view, similar to FIG. 16, of an alternative embodiment of the invention, in which the side stops are provided with respective connecting tabs, the figure showing the upper and lower deployable fasteners in an extended or deployed position and engaged with the connecting tabs.

The illustration of FIG. 17 shows a magazine holder 100c in accordance with a further variation of the invention, similar to that of FIGS. 16 and 17, where the knobs 166 and 186 are replaced with first and second connecting tabs 190 and 192 formed at the side stops 110 and 116 of the lower and upper holders 104 and 106, respectively. The lower and upper deployable fasteners 150 and 170 may be connected to the side stops 110 and 116 by extending the fastener bodies 152 and 172 across the first gaps 130a and 132a and disconnectably hooking the second ends 156 and 176 onto the first and second connecting tabs 190 and 192.

Unless specifically stated otherwise as apparent from the above discussion, it is appreciated that throughout the description, discussions utilizing terms such as "identifying" or "calculating" or "determining" or "executing" or "performing" or "collecting" or "creating" or "sending" or the like, refer to the action and processes of an electronic system, a computer system, or similar electronic computing device, that manipulates and transforms data represented as physical (electronic) quantities within the computer system's registers and memories into other data similarly represented as physical quantities within the computer system memories or registers or other such information storage devices.

To the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Since many modifications, variations, and changes in detail can be made to the described exemplary embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A magazine holder, comprising:
    a backplate, comprising a front surface and an opposite, rear surface, the backplate comprising at least one attachment device configured to secure the backplate to a structure;
    an upper holder coupled to the backplate and extending frontward of the front surface of the backplate, wherein the upper holder and the backplate define an upper holding space arranged frontward of the backplate, the upper holding space configured to receive an upper portion of a firearm magazine; and
    a lower holder coupled to the backplate and extending frontward of the front surface of the backplate, wherein the lower holder and the backplate define a lower holding space arranged frontward of the backplate, the lower holding space configured to receive a lower portion of the firearm magazine; wherein
    each one of the upper and lower holders defines a respective, first gap, wherein the first gap of the upper holder is arranged in spatial communication with the upper holding space and is positioned along a front corner area of the upper holding space at one of a left side and a right side of the magazine holder, and the first gap of the lower holder is arranged in spatial communication with the lower holding space and is positioned along a front corner area of the lower holding space at said one of the left side and the right side of the magazine holder; and further wherein with the backplate secured to the structure by the at least one attachment device, and the upper holder and lower holder extending frontward of backplate and structure, the magazine holder is switchable between:
- a first configuration, in which the upper and lower portions of the firearm magazine are removably received within the upper and lower holding spaces of the upper and lower holders, respectively, and the respective, first gaps of the upper and lower holders are sized such that the magazine holder is not removable from the upper and lower holding spaces through said respective, first gaps, thereby securing the firearm magazine to the magazine holder and consequently to the structure, and
- a second configuration, in which said respective, first gaps are sized such that the magazine holder is removable from the upper and lower holding spaces through said respective, first gaps; wherein the magazine holder is elastically biased to switch from the second configuration to the first configuration.

2. The magazine holder of claim 1, wherein the at least one attachment device comprises a hook-and-loop fastener member configured to attach to a mating hook-and-loop fastener member of the structure.

3. The magazine holder of claim 1, wherein the upper holder comprises a retaining arm and side stop, the retaining arm extending from the backplate at said one of the left side and the right side of the magazine holder, and the side stop extending from the backplate at the other of the left side and the right side of the magazine holder, wherein the retaining arm and the side stop are separated from one another by the first gap of the upper holder, wherein, in the first configuration, the retaining arm blocks a lateral or frontward movement of the firearm magazine and the side stop blocks a lateral movement of the firearm magazine.

4. The magazine holder of claim 3, further comprising a deployable fastener extendably carried by one of the retaining arm and the side stop, wherein, in the first configuration, the deployable fastener is extended from said one of the retaining arm and the side stop to the other of the retaining arm contributing to retain the upper portion of the firearm magazine within the upper holding space.

5. The magazine holder of claim 3, wherein the retaining arm extends from the right side of the backplate, and the side stop extends from a left side of the backplate, and further wherein, in the first configuration, the retaining arm blocks a rightward or frontward movement of the firearm magazine, and the side stop blocks a leftward movement of the firearm magazine.

6. The magazine holder of claim 3, wherein the retaining arm comprises a side portion and an end portion forming an L-shaped arrangement, wherein a rear end of the side portion extends from the backplate, and the end portion extends from a front end of the side portion towards the side stop, and further wherein the first gap of the upper holder is defined between the side stop and the end portion of the retaining arm.

7. The magazine holder of claim 3, wherein the retaining arm is deformable, and further wherein, in the second configuration of the magazine holder, the retaining arm is deformed outward relative to the first configuration enlarging the first gap of the upper holder with respect to the first configuration.

8. The magazine holder of claim 7, wherein the retaining arm is elastically deformable, and elastically biased to deform inward to return the magazine holder to the first configuration.

9. The magazine holder of claim 8, wherein, in the first configuration, the retaining arm abuts against the upper portion of the firearm magazine thereby securing the upper portion onto the front surface of the backplate.

10. The magazine holder of claim 1, wherein the lower holder comprises a retaining arm and side stop, the retaining arm extending from the backplate at said one of the left side and the right side of the magazine holder, and the side stop extending from the backplate at the other of the left side and the right side of the magazine holder, wherein the retaining arm and the side stop are separated from one another by the first gap of the lower holder, wherein, in the first configuration, the retaining arm blocks a lateral or frontward movement of the firearm magazine and the side stop blocks a lateral movement of the firearm magazine.

11. The magazine holder of claim 10, further comprising a deployable fastener extendably carried by one of the retaining arm and the side stop, wherein, in the first configuration, the deployable fastener is extended from said one of the retaining arm and the side stop to the other of the retaining arm contributing to retain the lower portion of the firearm magazine within the lower holding space.

12. The magazine holder of claim 10, wherein the retaining arm extends from the right side of the backplate, and the side stop extends from a left side of the backplate, and further wherein, in the first configuration, the retaining arm blocks a rightward or frontward movement of the firearm magazine, and the side stop blocks a leftward movement of the firearm magazine.

13. The magazine holder of claim 10, wherein the retaining arm comprises a side portion and an end portion forming an L-shaped arrangement, wherein a rear end of the side portion extends from the backplate, and the end portion extends from a front end of the side portion towards the side stop, and further wherein the first gap of the lower holder is defined between the side stop and the end portion of the retaining arm.

14. The magazine holder of claim 10, wherein the retaining arm is deformable, and further wherein, in the second configuration of the magazine holder, the retaining arm is deformed outward relative to the first configuration enlarging the first gap of the lower holder with respect to the first configuration.

15. The magazine holder of claim 14, wherein the retaining arm is elastically deformable, and elastically biased to deform inward to return the magazine holder to the first configuration.

16. The magazine holder of claim 15, wherein, in the first configuration, the retaining arm abuts against the lower portion of the firearm magazine thereby securing the lower portion onto the front surface of the backplate.

17. The magazine holder of claim 1, wherein the upper holder further comprises a top stop extending frontward from the backplate and over the upper holding space, the top stop configured to block an upward movement of the firearm magazine in the first configuration.

18. The magazine holder of claim 1, wherein the lower holder further comprises a bottom stop extending frontward from the backplate and below the lower holding space, the bottom stop configured to block a downward movement of the firearm magazine in the first configuration.

19. The magazine holder of claim 1, wherein the upper and lower holders are elastically deformable and elastically biased to switch from the second configuration to the first configuration.

20. The magazine holder of claim 1, wherein the at least one attachment device allows to selectively secure the magazine holder to the structure in different, first and second orientations with respect to a wearer of the structure, wherein:
- with the magazine holder secured to the structure in the first orientation, the respective, first gaps are oriented towards a right hand of the wearer; and
- with the magazine holder secured to the structure in the second orientation, the respective, first gaps are oriented towards a left hand of the wearer.

* * * * *